United States Patent [19]

Conrad

[11] Patent Number: 5,070,264
[45] Date of Patent: Dec. 3, 1991

[54] POSITION SENSOR

[75] Inventor: Armin Conrad, Herborn-Hörbach, Fed. Rep. of Germany

[73] Assignee: Arthur Pfeiffer Vakuumtechnik Wetzlar GmbH, Asslar, Fed. Rep. of Germany

[21] Appl. No.: 582,246

[22] Filed: Sep. 14, 1990

[30] Foreign Application Priority Data

Sep. 16, 1989 [DE] Fed. Rep. of Germany ....... 3930958

[51] Int. Cl.[5] .......................................... H02K 23/16
[52] U.S. Cl. .................................. 310/68 B; 310/192; 324/173
[58] Field of Search .................... 310/68 B, 192, 156, 310/166, 171, 168; 324/173, 174; 318/652

[56] References Cited

U.S. PATENT DOCUMENTS

| | | |
|---|---|---|
| 2,797,376 | 6/1957 | Meade . |
| 3,175,140 | 3/1965 | Hogan et al. . |
| 3,501,664 | 3/1970 | Veillette ............................ 324/173 |
| 4,525,670 | 6/1985 | Miyagawa et al. ................. 310/168 |
| 4,652,820 | 3/1987 | Maresca ............................ 318/652 |
| 4,970,423 | 11/1990 | Tamae et al. ..................... 310/68 B |

FOREIGN PATENT DOCUMENTS

| | | |
|---|---|---|
| 190918 | 8/1986 | European Pat. Off. . |
| 1815091 | 6/1970 | Fed. Rep. of Germany . |
| 1921931 | 7/1972 | Fed. Rep. of Germany . |
| 2527057 | 12/1976 | Fed. Rep. of Germany . |
| 2556897 | 12/1983 | France . |

Primary Examiner—Steven L. Stephan
Assistant Examiner—Ed To
Attorney, Agent, or Firm—Toren, McGeady & Associates

[57] ABSTRACT

DC motors without collectors require position sensors, which recognize or identify the angular position of the rotor, in order to supply a pulse for control of the current in the coil at a suitable point in time. Hall probes which, as a rule, are used as positional sensors, involve a series of disadvantages, such as for instance sensitivity to temperature and radiation. In order to avoid these disadvantages, coils with a magnetic core through which alternating current is passed are installed in the stator-rotor air gap in accordance with the invention. The rotor comprises in the axial segment opposite the coils a magnetic portion and a nonmagnetic portion. This generates a change in the voltage drop at the coil during each rotor revolution.

8 Claims, 1 Drawing Sheet

POSITION SENSOR

The present invention is directed to an arrangement for identifying the angular position of the rotor of a collectorless or brushless DC motor, hereinafter also called a position sensor.

BACKGROUND OF THE INVENTION

In a collectorless DC motor, the electronic commutation arrangement must always switch-on the coils when they have a favorable position with respect to the rotating field magnet for torque generation.

The positional recognition of the rotating rotor is generally determined by means of Hall probes. These supply a pulse voltage under the influence of the magnetic field of the rotor, which voltage is utilized for controlling the electronic commutation arrangement. The quantity and arrangement of the Hall probes must be selected corresponding to the number of phases of the stator winding. Hall integrated circuits, which are also utilized instead of normal Hall probes, also comprise integrated electronics.

A number of disadvantages are involved in this up-to-now extensively used technology:

(1) Semiconductor components, to which Hall probes and Hall integrated circuits belong, have a negative temperature coefficient. As a result, they exhibit a temperature dependence of their resistances and with it also of their output signals. For this reason, problems can occur in the course of signal recognition. The level of the signals can within certain limits be compensated by the electronic circuits. This requires an added expenditure.

(2) The temperature sensitivity of the semiconductor components causes a high failure rate.

(3) The utilization area of the Hall probes and Hall integrated circuits is further limited by their sensitivity to radiation. In a radiation intensive environment, for instance, in accelerator installations, defects in semiconductor components increase, which leads to improper functioning.

(4) A further disadvantage is the number of connector lines from the Hall probes to the electronic commutation arrangements. Six lines are required for each Hall probe, which results in an undesirable expense when several probes are utilized. The length of the connector lines is limited, since phase errors of the signals are caused by the capacitances of the cables and, additionally, inducement of malfunctions in the current supply to the motor are unavoidable. The useful signal-to-noise ratio is then very low because of the low level of the useful signal.

SUMMARY OF THE INVENTION

The invention has as its main object an apparatus and a method for identification of the angular position of the rotor of a DC motor without a collector, which avoids all the above stated disadvantages.

In accordance with one aspect of the invention, instead of using Hall probes as the positional sensors, at least one coil is positioned in the stator-rotor air gap. Preferably, the coil is provided with a magnetic core. Means are provided to pass an alternating current (AC) through the coil. Means are also provided to cause a voltage change at the coil once per rotor revolution.

In accordance with another aspect of the invention, the desired voltage change across the coil is obtained by providing the rotor segment opposite to the coil with circumferentially-spaced permanent magnetic and non-magnetic portions. As a result, the voltage change occurs at the transition of the permanent magnetic and non-magnetic portions as they rotate past the coil.

Preferably, the coil is provided with a magnetic ferrite core, which offers certain advantages. In addition, the AC current preferably has a frequency substantially higher than the nominal rotational frequency of the rotor. An AC frequency of the order of 20-40 KHz is preferred.

The invention represents a reliable arrangement for identification of the angular position of the rotor of a collectorless DC motor. No semiconductor components whatever are required at the utilization site of the motor for it to function. This avoids the disadvantages which arise for instance because of the negative temperature coefficient, the temperature sensitivity and the radiation sensitivity. The connection from the motor to the electronic commutation arrangement is considerably simplified, since only two instead of six lines are required for each position sensor.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described the preferred embodiments of the invention.

DETAILED DESCRIPTION OF THE PREFERRED EMBODIMENTS

Figure 1:
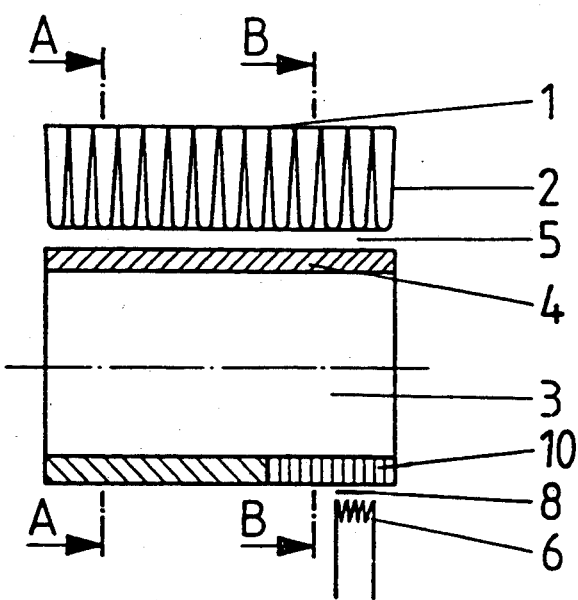
FIG. 1 is a longitudinal section through a collectorless DC motor.
Figures 2, 3:
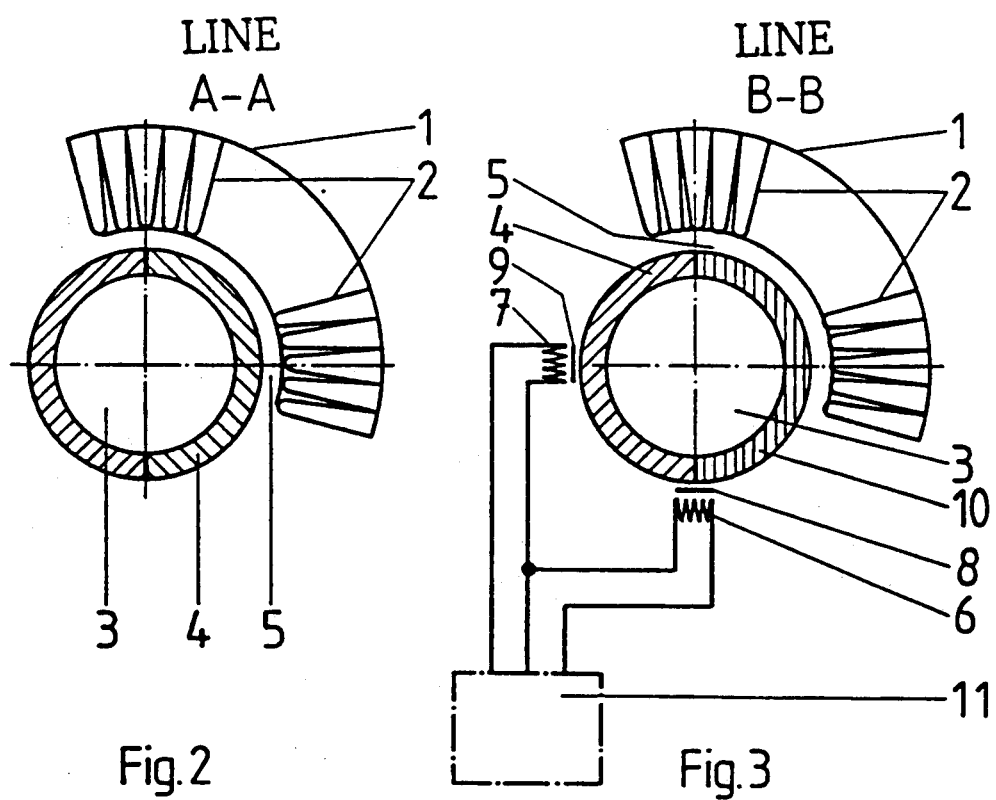
FIG. 2 is a cross-section along line A—A of the collectorless DC motor shown in FIG. 1.
FIG. 3 is a cross-section along line B—B of the collectorless DC motor shown in FIG. 1.

FIG. 1 shows in longitudinal section and FIG. 2 in cross-section along line A—A in FIG. 1 the basic construction of a two-phase collectorless DC motor. This motor comprises a stator 1 with stator windings 2 and a rotor 3 with a permanent magnetic part 4. An air gap 5 is located between the rotor 3 and the stator 1.

The permanent magnetic part 4 with North and South poles produces a constant magnetic field strength in the air gap 5, which together with the stator windings 2, through which current flows, generate a torque. Depending on the position of the North and South magnetic poles, relative to the stator windings 2, the polarity of the current flow in these stator windings must be reversed accordingly.

For positional recognition or identification of the rotor position, the invention installs in the air gap coils 6 and 7 with one core 8 and 9, respectively, from ferrite material, instead of the Hall probes hitherto used, arranged to be offset through 90°.

Soft magnetic ferrite material is used here because it has a narrow and rectangular hysteresis characteristic. The losses are kept small because of the narrow shape and because of the low remanence or residual magnetism and the steep rise of the hysteresis characteristic which is reflected in the rectangular shape, entails that the saturation range is reached very rapidly with small changes in field strength. Instead of ferrite material, other materials can also be utilized which have equivalent or similar properties.

Since the arrangement of the coils 6 and 7 and the cores 8 and 9 from ferrite material cannot distinguish between the magnetic North and South poles of the rotor magnets and per rotor revolution, and only one signal per coil is desired, only half of the rotor is covered with permanent magnetic material 4 (FIG. 3) in the axial region of the rotor 3 opposite to where the coils 6 and 7 are located. In other words, only at the end region opposite to where the coils are located, the rotor is provided over only one-half of its circumference with permanent magnetic material.

The opposite rotor side is provided with non-magnetic material 10 of the same density in order to avoid any imbalance in the rotor.

During operation, an alternating current is caused to flow through the coils 6 and 7. The frequency of this alternating current is chosen large compared to the nominal rotational frequency of the rotor. As one example, it amounts to approximately 30 Khz. A suitable range is about 20-40 Khz. The inductance of the coil is very large because of the high permeability of the cores 8 and 9 consisting of ferrite material. Because of this and the high frequency current, a high voltage drop is produced across the coil during the half of the rotor revolution in the course of which no magnetic flux penetrates the coil. This is respectively the case when coils 6 and 7 are located opposite to the non-magnetic material portion 10 of the rotor.

When, however, these coils 8 and 9 from ferrite material are intersected during the next half of the rotor revolution by the strong magnetic flux of the rotor permanent magnet 4, the ferrite material saturates. This causes a strong reduction in the inductance of the coils 6 and 7, and the voltage drop across the coils is thereby greatly reduced.

This change in the amplitude of the AC voltage across the coils 6, 7 is utilized as a signal for controlling a conventional commutation circuit arrangement 11 for driving the stator windings 2. The separate circuitry for supplying the AC current for the coils 6, 7 is also conveniently housed within the block indicated by reference 11.

While the invention has been described in connection with preferred embodiments, it will be understood that modifications thereof within the principles outlined above will be evident to those skilled in the art and thus the invention is not limited to the preferred embodiments, but is intended to encompass such modifications.

What is claimed is:

1. In a brushless DC motor having a permanent magnetic rotor surrounded by a stator having windings and spaced from the rotor by an air gap, and further having means for driving the stator windings including means for identifying the angular position of the rotor, the improvement comprising:

at least one coil having a magnetic core mounted in the air gap, means for passing alternating current through the coil to establish a voltage across the coil, means for intermittently magnetically saturating the core once per rotor revolution causing the voltage across the coil to change as a function of the revolutions of the rotor, and means for using the changing voltage as a control signal for driving the stator windings.

2. The motor of claim 1, wherein each coil comprises a core of magnetic material having a narrow rectangular hysteresis characteristic, and the alternating current has a frequency which is high compared to the nominal rotational frequency of the rotor.

3. The motor of claim 2, wherein the rotor is covered only across half of its circumference with permanent magnetic material in the axial region opposite to where each coil is located and the opposite rotor side in said region is provided with non-magnetic material of substantially the same density.

4. The motor of claim 3, wherein the motor is a two-phase motor, and two coils are provided offset 90° from each other.

5. The motor of claim 2, wherein the alternating current frequency is of the order of 20-40 KHz.

6. A method for identifying the angular position of the rotor of a collectorless DC motor having a permanent magnetic rotatable rotor surrounded by a stator having windings and spaced from the rotor by an air gap, and further having means for driving the stator windings, comprising the steps:

(a) providing at least one coil having a soft magnetic core in the gap, (b) providing on the rotor axial segment opposite the coil consecutive circumferential permanent magnetic and non-magnetic material portions, said permanent magnetic material forming a single pole producing a field which when adjacent the core will saturate the core once per rotor revolution, (c) while the rotor is rotating, passing an alternating current through each coil to produce a voltage drop across the coil, (d) sensing the change of the voltage drop at each coil which is caused in the course of one revolution of the rotor by the sequential passage of permanent magnetic material and non-magnetic material past the coil for identifying the angular position of the rotor.

7. The method according to claim 6, wherein the rotor is rotated at a nominal rotational frequency, the alternating current used has a frequency substantially greater than the nominal rotational frequency of the rotor, and the non-magnetic material occupies one-half of the rotor circumference.

8. The method of claim 7, wherein each coil has an inductance and is provided with a ferrite core which tends to saturate when the permanent magnetic segment of the rotor passes by the core, the saturation condition causing the coil inductance to greatly diminish and as a consequence thereof a considerable reduction in the voltage drop.

* * * * *